United States Patent [19]

Schröder

[11] Patent Number: 4,549,592
[45] Date of Patent: Oct. 29, 1985

[54] ROLLER FOR MOVING EQUIPMENT, FURNITURE OR THE LIKE

[75] Inventor: Dieter Schröder, Wermelskirchen, Fed. Rep. of Germany

[73] Assignee: Paul Vom Stein & Co., Wermelskirchen, Fed. Rep. of Germany

[21] Appl. No.: 446,973

[22] Filed: Dec. 6, 1982

[30] Foreign Application Priority Data

Dec. 7, 1981 [DE] Fed. Rep. of Germany ....... 3148313

[51] Int. Cl.⁴ .............................................. B60C 7/00
[52] U.S. Cl. .................................. 152/328; 152/378 R; 301/63 PW
[58] Field of Search .............................. 152/323–328, 152/5, 7, 246, 378 R, 379.3; 295/7, 11, 14; 301/63 PW; 193/37

[56] References Cited

U.S. PATENT DOCUMENTS

| | | | |
|---|---|---|---|
| 1,258,573 | 3/1918 | Johnstone | 152/328 X |
| 1,447,365 | 3/1923 | Walther | 152/325 |
| 1,921,548 | 8/1933 | Soulen | 152/325 |
| 2,603,267 | 7/1952 | Simpson | 152/324 X |
| 3,651,911 | 3/1972 | Kornylak | 152/313 X |
| 4,127,166 | 11/1978 | Wyman | 152/323 |

FOREIGN PATENT DOCUMENTS

| | | |
|---|---|---|
| 2105937 | 8/1971 | Fed. Rep. of Germany . |
| 1806146 | 9/1971 | Fed. Rep. of Germany . |
| 2080550 | 11/1971 | France . |

*Primary Examiner*—Edward Kimlin
*Assistant Examiner*—Thomas Bokan
*Attorney, Agent, or Firm*—Karl F. Ross; Herbert Dubno

[57] ABSTRACT

A roller for moving equipment such as furniture has a wheel whose wheel disk is provided with a rim having a pair of outwardly extending flanges. The tire mounted on this rim has an inner portion wholely received between the flanges and an outwardly portion lying wholely outwardly of the flanges. The inner portion is provided with such bores in angularly equi-spaced relationship and wholely within the circumference of the flanges so as to be closed therebetween. The outer portion is flush with the outer surfaces of the flanges.

1 Claim, 6 Drawing Figures

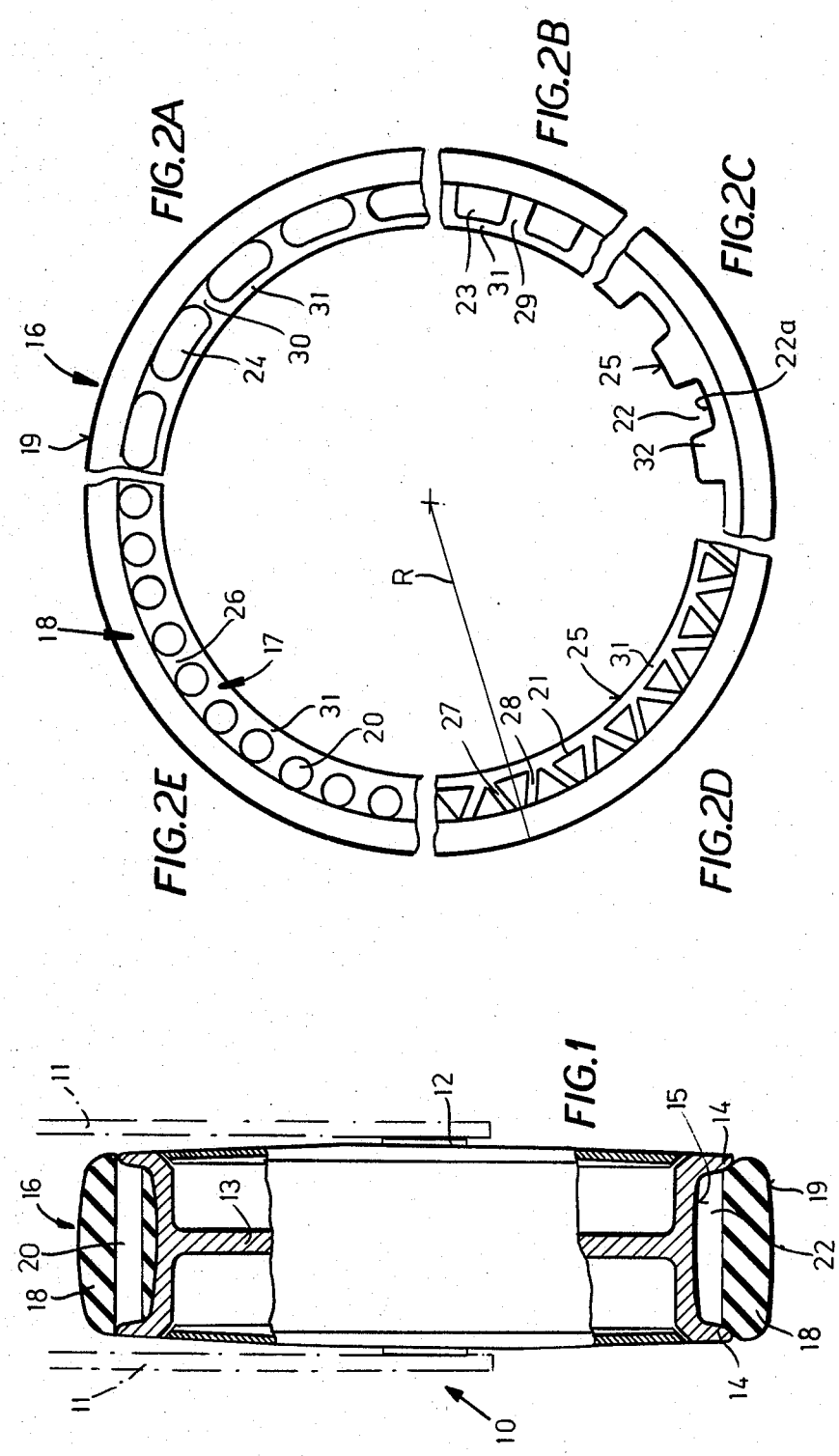

ROLLER FOR MOVING EQUIPMENT, FURNITURE OR THE LIKE

FIELD OF THE INVENTION

The invention relates to a roller for moving equipment, furniture or the like wherein at least one tire fitted on a wheel rim is made of an elastomer material.

BACKGROUND OF THE INVENTION

Such rollers are known in numerous constructions. The tire consists mostly of a rubber compound with the advantage of high elasticity. Lately high-quality rubber compounds became very expensive. In order to save, one has to depend on low-grade rubber compounds subject to higher wear.

OBJECT OF THE INVENTION

It is the object of this invention to equip a roller of the kind described with a tire combining outstanding wear properties with low-cost material, without loss of elasticity.

Another object of the invention is to fit the tire on the rim in manner preventing detachment or unacceptable deformation.

The invention attains those objects by providing a tire made of highly abrasion-proof elastomer, such as polyurethane (PU), having a plurality of recesses disposed parallel to the wheel axis and exclusively on the inside of the section positioned within the circumference of the rim flange, the walls of said recesses being set close to the inner surface of the tire or being part of the same.

Due to the highly abrasion-resistant elastomer of the tire in combination with the recesses set parallel to the wheel axis, it is possible to obtain a thinner tire having outstanding suspension properties, despite its reduced material consumption. By providing the recesses exclusively on the inside area of the circumference of the rim flanges it is insured that dirt and other contaminants can not enter the recesses. This also prevents deterioration of the recesses in any way to impair or annihilate the elasticity of the tire. By arranging the recesses close to the inner surface of the tire, considerable transversal extension and thereto related transversal forces when the tire is compressed are reduced to a minimum and as a result the rim flanges not loaded at all or are only slightly loaded by lateral forces. Through lateral shielding of the perforated area of the tire by the rim flanges, these serve as lateral support for the tire in the deformation area thereof, so that the desired deformation of the portions remaining between recesses can be generated for the desired degree of elasticity.

From German published patent specification 18 06 146 it is known to use a roller body made of urethane and to influence its suspension and damping actions through the recesses situated in the roller body. This known roller body or tire is not imbedded in a rim but is fitted on a shoulderless or flangeless metallic bushing. The recesses extend to the exterior completely open in a median area of the tire ring, which is very wide in a radial direction. Also the recesses do not penetrate the tire. The recesses directed from both frontal sides of the tire open into a median web area. In addition, the tire is designed to be provided on its outside with a tire casing to enhance its stability. Finally, all portions left between recesses are shown to be slanted in the same direction (FIG. 5 of German published patent specification No. 18 06 146) in a side view of the tire. Due to this the deformation of the tire under pressure is unilateral, leading to strongly a symmetrical deformation of the tire and to a considerable squeezing effect.

The German published patent specification No. 18 06 146 basically proposes a wheel with a tire rendered elastic by recesses, whose wear-resistance is insured by a special tire casing enveloping the tire. The object of the present invention is to use a thin tire, which in itself is wear resistant and wherein the recesses, respectively the portions between them are arranged to prevent an a symmetrical compression of the tire and, moreover, to remain fully dependable, even after extended use of the tire. The configurations of the tire known from German published specification No. 18 06 146, as well as of the tire of the present invention, lend themselves to be imbedded in the rim base, whereby the rim flanges shield the exterior openings of the recesses, otherwise due to the compression of the tire running on the circumferences of the rim flanges would be unavoidable.

According to a feature of the invention the portion of the overall thickness of the wall of the tire section located between the rim flanges, measured radially, is greater than or at least equal to half of the overall radial thickness of the tire. The roller thus presents a larger cross section of the tire, but still fully embedded in the rim base, meant for suspension and damping, while the outer running surface corresponds to a relatively thin section of the tire. In addition this contributes to an outstanding exterior appearance of the roller. Besides, due to this geometry, very safe fitting of the tire in the rim base results. The portions located between two recesses can be arranged essentially radially. the web can also lie at angles to the radius alternately in different directions. Thereby an essentially radial tire compression in the tire contact area always results, minimizing the loss due to squeezing action.

It has proved to be advantageous to use an elastomer tire material, with a hardness of 80 to 90 Shore. Especially outstanding properties are found in an injectable polyurethane (PU).

BRIEF DESCRIPTION OF THE DRAWING

FIG. 1 is a longitudinal section through the wheel of the invention; and

FIGS. 2A-2E are side views of various tire structures in fragmentary form wherein a variety of possible shapes of the recesses are represented over different sections.

SPECIFIC DESCRIPTION

According to FIG. 1, a bogie wheel generally marked 10 comprises a wheel fork whose shanks 11 support a wheel axle 12 on which a wheel rim 13 can rotate freely. The wheel rim 13 has a rim base 15 situated between two rim flanges 14, in which rests a tire 16.

The circular tire 16 consists of an inner section 17 and an outer section 18. The width (FIG. 1) of the inner section 17 corresponds approximately to the clear width of the rim base 15 between the rim flanges 14, while the wider outer section is in this case so shaped as to ensure the correspondence of the exterior width of the tire section 18 to the exterior rim width in the area of the rim flanges 14. In the longitudinal section according to FIG. 1, the tire has a somewhat T-shaped cross section. The outer section 18 has a flat-surface, while the running surface 19—as shown in FIG. 1—is slightly spherical. Besides, the tire is made of a highly abrasion-resistant polyurethane (PU) having a hardness advantageously between 80 and 90 Shore.

In order to confer special elasticity to this tire, said tire has—exclusively within the inner section 17—a multitude of recesses arranged at equal distances in a circumferential direction, said recesses being shaped for instance circularly 20 in FIG. 2E, with triangular configuration at 20 in FIG. 2D, as rectangular passages 22 or 23 in FIG. 2C or bean-shaped passage 24, said recesses being either enclosed openings or, like the recesses marked 22 open towards the inside in such a way that the wall area 22a of a recess 22 becomes part of the inner surface 25 of the tire.

Especially in those embodiments where the recesses 20, 21, 23 and 24 are provided with an enclosed inner surface, the portions between them, 26 to 30 should be relatively thin. Also, the remaining annular portion 31 between the recesses and the inner surface 25 has to be thin.

As shown in FIG. 1, the recesses (in this case 20 and 22) are located entirely within the rim base 15 bordered by the rim flanges 14. Thereby no contaminants, pebbles, dust or other particles can enter the recesses positioned exclusively in the inner section 17 (sic) of the tire, avoiding this way any reduction or annihilation of the elasticity. Thereby an unobjectionable and smooth run is achieved.

In cases where the portions between recesses are not radially disposed, as the here shown portions 27 an 28, they run alternately at approximately equal angles in different directions with respect to radius R, whereby in principle a purely radial and in any case symmetrical shock-absorption by the tire is insured.

The elasticity effect in the case of the recesses 22 is achieved during the compression of the tire due to to the withdrawal in circumferential direction of the remaining portion 32 which in this case is relatively thick.

I claim:

1. A floor-engaging roller for moving equipment comprising:

a rim provided with a pair of outwardly extending annular flanges and a wheel body carrying said rim for moving same on an axle; and a unitary one-piece tire mounted on said rim, said tire being composed of polyurethane elastomer and having a radially inner portion lying wholely between said flanges against said rim and a radially outer portion lying wholely outwardly of said flanges in a radial direction and substantially flush laterally with outer surfaces thereof, said radially inner portion substantially filling said rim between said flanges and being provided with a plurality of angularly equi-spaced bores extending completely through said radially inner portion adjacent said radially outer portion and in a direction parallel to an axis of rotation of the rim on said axle, said bores lying wholly within the circumference of said flanges so as to be closed thereby while providing elasticity for the tire, the radial thickness of said radially inner portion being at least equal to half the radial thickness of the tire.

* * * * *